United States Patent [19]

Hensley

[11] Patent Number: 5,388,646
[45] Date of Patent: Feb. 14, 1995

[54] METHOD FOR REJUVENATION OF INJECTION WELLS

[76] Inventor: Clifford J. Hensley, P.O. Box 3147, Odessa, Tex. 79760

[21] Appl. No.: 130,400

[22] Filed: Oct. 1, 1993

[51] Int. Cl.$^6$ .................. E21B 43/22; E21B 43/27
[52] U.S. Cl. .................. 166/271; 166/273; 166/307; 166/312
[58] Field of Search ............ 166/271, 273, 307, 312

[56] References Cited

U.S. PATENT DOCUMENTS

| | | | |
|---|---|---|---|
| 2,787,326 | 4/1957 | Hughes | 166/312 X |
| 3,532,168 | 10/1970 | Webb | 166/312 X |
| 3,612,182 | 10/1971 | Raifsnider | 166/273 X |
| 3,616,852 | 11/1971 | Allen | 166/271 |
| 3,638,729 | 2/1972 | Parker | 166/273 |
| 3,648,775 | 3/1972 | Dixon | 166/271 X |
| 3,756,319 | 9/1973 | Holm et al. | 166/312 X |
| 4,279,305 | 7/1981 | Knapp et al. | 166/271 X |
| 5,193,617 | 3/1993 | D'Souza | 166/273 X |

*Primary Examiner*—George A. Suchfield
*Attorney, Agent, or Firm*—Marcus L. Bates

[57] ABSTRACT

An injection well has become plugged with an accumulation of undesirable material that is causing the wellhead pressure required to effect a selected minimum flow rate of injection fluid into the formation to have increased to a maximum value. The method of this invention provides a process for treating the plugged formation to remove the accumulated undesirable material. The process requires a plurality of treatment cycles, and in each cycle injection fluid flows into the wellhead for a first time interval while injecting treatment chemical into the flowing injection fluid during a second time interval, with the first time interval being much longer than the second time interval. The well is acidized after a multiplicity of cycles and returned to operation.

21 Claims, 4 Drawing Sheets

A: INJECTION WATER
B: SURFACTANT CONCENTRATE

METHOD FOR REJUVENATION OF INJECTION WELLS

BACKGROUND OF THE INVENTION

Secondary recovery of hydrocarbons is carried out in an oil field by injecting several injection wells with appropriate injection fluid. The injection fluid radiates away from the injection wells and flows toward several producing wells, carrying hydrocarbons therewith and thereby increasing the production of the oil field. Fresh water, salt water, $CO_2$, $N_2$, and flue gases are common injection fluids used to drive the hydrocarbon from the partially depleted formation towards the producing wells. The wells are arranged in different patterns for optimizing the secondary recovery efforts.

The rate of flow of the injection fluid into the downhole formation is governed by the structural integrity of the injection borehole. Should the pressure exerted by the injection fluid on the well bore exceed a maximum value, the piping of the wellbore and the adjacent formation may rupture, causing contamination of the overlying aquifer. This is a disastrous event and the laws are very strict to assure that the intrusion of harmful chemicals into an aquifer does not occur as a result of employing too great a pressure on the injection well.

The vast quantity of injection fluid flowing into the injection well ultimately results in plugging of the depleted hydrocarbon bearing formation due to all sorts of things, such as accumulation of unwanted material, chemical reactions, translocation of debris, and similar phenomena that increase the pressure drop across the formation and require that the flow rate of the injection material be progressively decreased so as to avoid exceeding the maximum permissible pressure on the wellbore by the injection fluid. Iron sulphide, calcium sulphide, various carbonates, and debris are some of the contaminants that cause plugging and they are difficult to remove because of the isolation thereof by hydrocarbon based inhibitors that are invariable employed for reducing corrosion of the pipe in the borehole. These hydrocarbon encapsulate the contaminants making removal with acidizing techniques difficult and greatly increases the quantity of acid required to react with the contaminants.

A secondary recovery operation in an injection field will therefore eventually encounter a few wells of a plurality of wells that are slowly dropping in volumetric flow until the flow rate drops to an undesirable value. Eventually it becomes desirable for these few poor wells to be rejuvenated, that is, somehow treated and made to accept the desired volumetric flow at less than the maximum allowable pressure. This requires removing at least part of the contaminating material causing the formation to be plugged to thereby reduce the flow restriction to a value that allows the borehole to accept a reasonable quantity of the injection fluid at an acceptable pressure effected on the wellhead, formation, and borehole.

In the past it has been found that the obstruction, or contaminant causing a plugged formation, can be removed by treatment with chlorine dioxide and acrolein, followed by acidizing. The use of these two chemical compounds is environmentally objectionable because they are deadly poisonous and there is the possibility that they will ultimately contaminate our water supply. There is likelihood that under the best of conditions these compounds ultimately will appear in the produced oil, and possibly much worse results can occur if anything malfunctions with the overall injection system.

It is therefore desirable that alternate methods of unplugging hydrocarbon bearing formations associated with injection fields undergoing secondary recovery be safely substituted for the present method of treatment, and such a solution to this problem is the subject of this invention.

SUMMARY OF THE INVENTION

Figure 1:
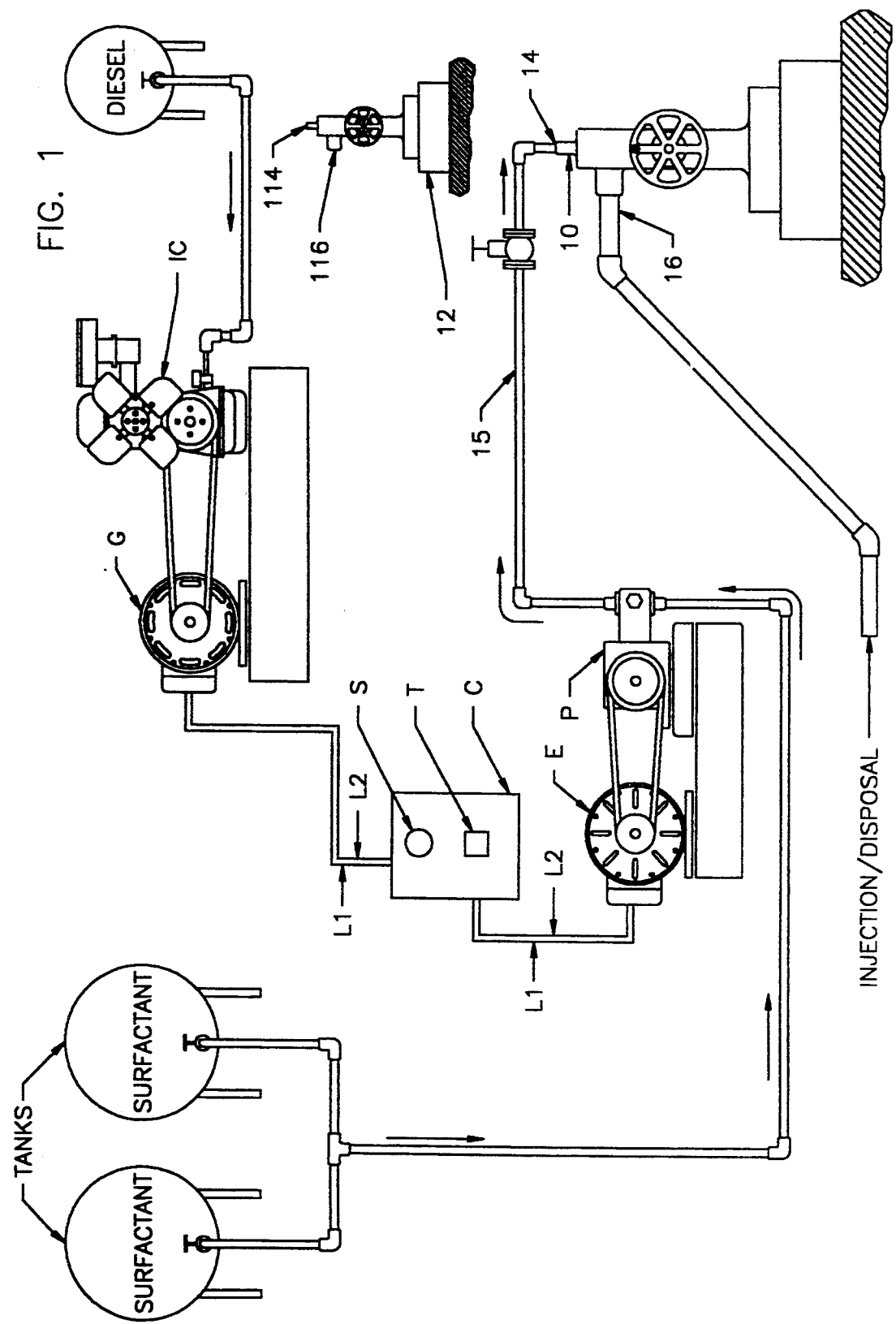
FIG. 1 is a part schematical, part diagrammatical view of an injection well treating system according to this invention.

The present invention relates to a process for cleaning and moving material that has accumulated within a formation of an injection well in an amount to cause the formation to become plugged. The injection well has a wellhead connected to receive injection fluid which flows through the wellbore thereof and downhole to the formation to drive hydrocarbons away from the injection well and towards a production well spaced therefrom.

A plurality of treatment cycles is carried out wherein during each cycle injection fluid flows into the injection wellhead while treatment chemical is intermittently admixed with the injection fluid flowing into the wellhead. More specifically, injection fluid flows into the wellhead during a first and second time interval, with treatment chemical being injected into the flowing injection fluid during said second time interval. The first time interval is much greater than the second time interval. This provides slugs of diluted treatment chemical flowing into the wellbore that are separated by the flowing injection fluid, thereby washing and then rinsing the formation.

The injection fluid flows into the wellhead at a flow rate that requires a pressure that is less than the fracture pressure that may damage the wellbore and formation. The treatment of the downhole formation may require a plurality of treatment cycles each hour for several days.

The treatment chemical includes a surfactant which is diluted and flows intermittently into the injection wellhead at a rate to establish a mixture of injection fluid and surfactant of suitable concentration. This flowing diluted mixture of surfactant constitutes a wash part of the cycle, while the flowing injection fluid is the rinse part of the cycle, and enables the invention to be carried out in conjunction with the plugged formation.

The mixture, as it migrates radially away from the borehole of the injection well, washes the hydrocarbons from the contaminants as the mixture travels through the formation and toward a production well. Next, the washed contaminants are rinsed by the injection fluid that follows each of the washing parts of the cycle. This alternate washing and rinsing of the plugged formation continues for many cycles until the hydrocarbons are washed away and no longer encapsulate the contaminants. Thus the contaminants are exposed or wetted by the injection fluid so that the subsequent acidizing step can come into intimate contact and chemically react with the contaminants, which now are easily dissolved or easily enter into chemical reaction with the acid. The removed contaminants along with the reaction products are translocated by the injection fluid towards the production wells. This unplugs the well by rejuvenating the injection formation so that a safe well-head operating pressure is achieved for a suitable flow rate of injection fluid through the formation.

A primary object of the present invention is the provision of a process for cleaning and moving material that may have accumulated within and plugged a formation of an injection well.

Another object of the invention is to provide a method of cleaning and solubilizing contaminants that have accumulated within and plugged a formation of an injection well.

A further object of this invention is to disclose and provide a method of removing hydrocarbons that encapsulate contaminants that plug a downhole formation of a wellbore to enable subsequent removal of the contaminants using acidizing techniques with less difficulty and thereby greatly reducing the quantity of acid required to react with the contaminants.

A still further object of this invention is to disclose and provide a method of treating a downhole formation of a wellbore to remove contaminants that plug the formation by cyclicly washing and rinsing the formation to enable subsequent removal with acidizing techniques to be carried out with less difficulty and thereby restore the well to efficient operation.

Another and still further object of this invention is the provision of a plurality of treatment cycles carried out by flowing injection fluid into the wellhead for a first time interval while injecting a surfactant into the flowing injection fluid for a second time interval at a rate to establish spaced mixtures of injection fluid and surfactant which migrate radially away from the injection well borehole. This washes hydrocarbons from the surface of the contaminants as the spaced mixtures of injection fluid and surfactant move radially away from the injection well and travel through the formation and toward a production well, whereupon the contaminants are washed by the surfactant and then rinsed by the injection fluid that follows each of the washing phases of the cycle. This cyclic washing and rinsing continues for many cycles until the hydrocarbons are removed from the contaminants and no longer encapsulate the contaminants. Then acid is forced into the borehole to solubilize the cleaned contaminants and to move the resultant solution away from the wellbore, thereby completing rejuvenation of the well.

These and various other objects and advantages of the invention will become readily apparent to those skilled in the art upon reading the following detailed description and claims and by referring to the accompanying drawings.

The above objects are attained in accordance with the present invention by the provision of a method for use with apparatus fabricated in a manner substantially as described herein.

DETAILED DESCRIPTION OF THE PREFERRED EMBODIMENT

Figure 2:
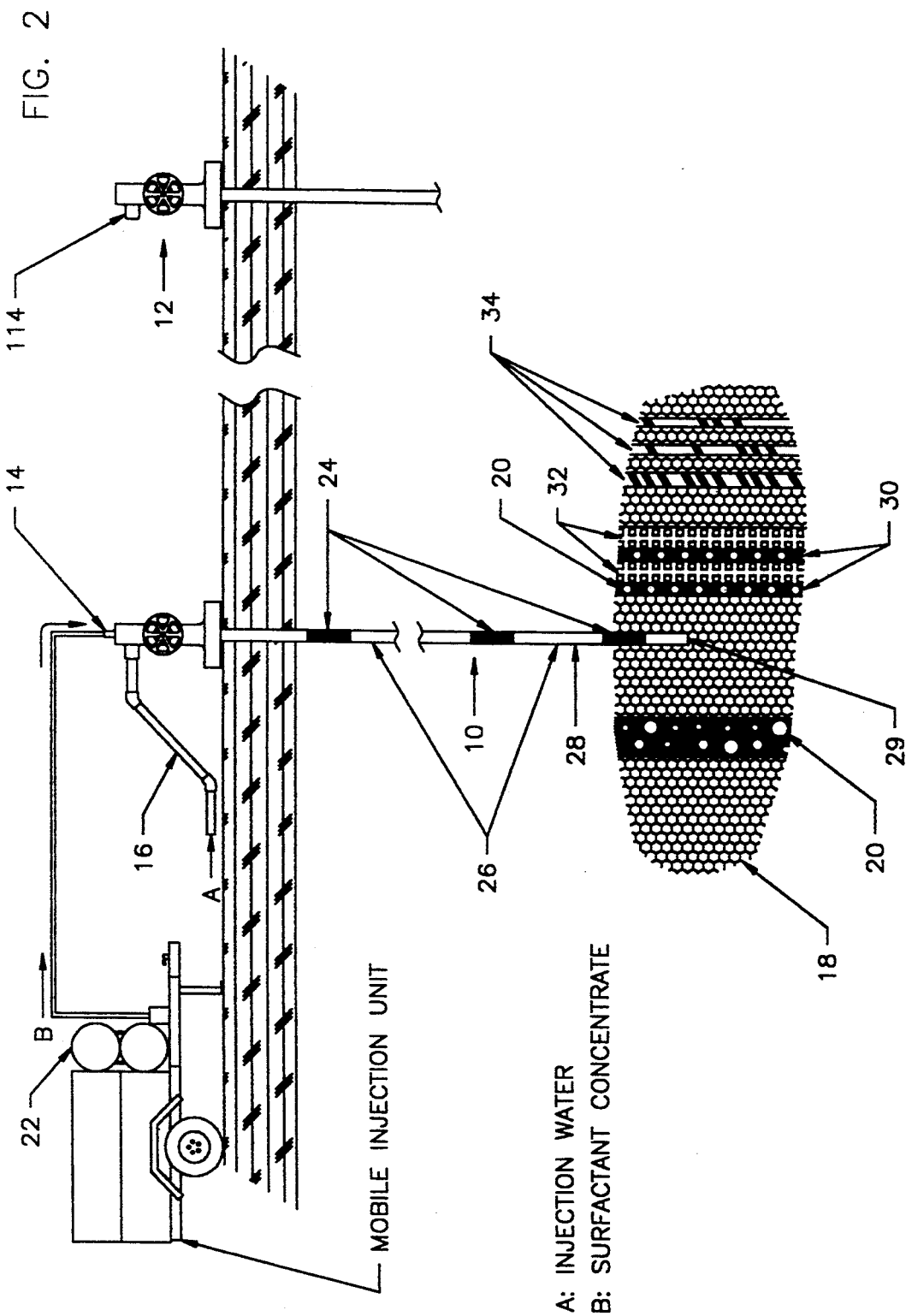
FIG. 2 is a part schematical, part diagrammatical, part cross-sectional view of a wellbore and treating system showing additional details of this invention.

In the figures of the drawings, and particularly in FIGS. 1 and 2, an injection well 10 is spaced from a production well 12. The injection well 10 has a wellhead 14 which receives injection fluid at 16 for driving hydrocarbons from a formation 18 towards the production well 12. The injection well formation 18 has become plugged with contaminants 20 that have accumulated therein over an interval of time and thereby causes the wellhead pressure required to effect a selected minimum flow rate of injection fluid into formation 18 to be progressively increased until it has reached a maximum permissible value.

The production well 12 has a wellhead 114 which produces hydrocarbons at outlet 116.

The method of this invention provides a process for treating the plugged formation 18 to remove the accumulated undesirable plugging material or contaminants 20 by carrying out the steps of:

(1) pumping injection fluid 16 into the wellbore during a first time interval, while (2) pumping a treatment fluid or chemical 22 into the flowing injection fluid 16 during a second time interval;

(3) preparing said treatment chemical 22 by admixing a surfactant with a diluent, with the resultant mixture of treatment chemical 22 being of a sufficient concentration to wash the surface of the plugging material or contaminants free of hydrocarbons and thereby expose the surface to the flowing injection fluid;

(4) cyclically treating the well by repeating steps (1) and (2) a plurality of times until the surface of the plugging material or contaminants is free of hydrocarbons and thereby exposed for step (5), (5) acidizing the well, (6) returning the treated well to an operative condition, As shown in FIGS. 1 and 2, this process is carried out by connecting wellhead 14 to receive treatment chemical 22 which flows through flow line 15 and is admixed at wellhead 14 with the flowing injection fluid 16 to provide slugs 24 of treatment fluid or chemical 22 spaced from one another by slugs 26 of injection fluid 16, all of which flows down through the borehole 28 of injection well 10, through the borehole outlet 29 thereof, and to the downhole formation 18 to wash hydrocarbons from the contaminants 20 that are the cause of the plugging of formation 18.

In FIGS. 1, 2 and 5, the slugs 26 of injection fluid exit the borehole outlet 29 and flow radially through formation 18 as waves of injection or rinse fluid 30 that travel toward the production well 12. At the same time, smaller slugs 24 of treatment chemical 22 exit the borehole outlet 29 and flow radially through formation 18 as waves of wash fluid or treatment chemical 32 that also travel toward the production well 12, thereby alternately subjecting formation 18 to a washing and rinsing action, as the production fluid 34 is moved towards the production well 12 spaced therefrom.

As particularly seen in FIG. 1, portable equipment mounted on a small trailer is transported to the injection well 10 and a pump P thereof is connected to the injection wellhead 14 by a flow line 15. An internal combustion motor IC drives a generator G connected to electric motor E by means of electrical lines L1, L2 and a controller C. The electric motor E drives the pump P which forces surfactant or treatment chemical 22 into flow line 15 and on into wellhead 14. The controller C includes a timer T that causes starter S to start and run motor IC for a second time interval following a first downtime interval. This actuates pump P each part of the treatment cycle in which treatment fluid or chemical 22 is injected into the wellbore 28 for the wash cycle.

Hence, the process for cleaning and removing the accumulated plugging material from within formation 18 is carried out in a plurality of treatment cycles, with each cycle comprising flowing injection fluid 16 along a flow line into wellhead 14 for a first time interval while injecting treatment chemical 22 into the flowing injection fluid for a second time interval. The first time interval being much greater than the second time interval, with there being several treatment cycles carried out each day. Preferably, there is more than one treatment cycle each hour for more than one day, thus providing numerous cycles of treatment prior to the acidizing step of FIG. 3.

The treatment chemical 22 used herein preferably is a gel type surfactant, diluted to be present in an amount greater than about 100 ppm (parts per million) as measured at outlet 29 of borehole 28; which is of sufficient concentration to provide significant cleaning activity up to a 100 foot radius from the injection well 10, and this is adequate for treating most wells.

It is necessary to flow the injection fluid 16 into the wellhead 14 at a flow rate requiring a pressure that is less than the fracture pressure of the wellbore piping and the formation 18, while intermittently flowing the treatment chemical 22 into the flowing injection fluid, preferably at the wellhead 14, and at a rate to establish spaced slugs 26 of injection fluid 16 and spaced slugs 24 of treatment chemical 22 of suitable concentration. The sum of the slugs 24 and 26 of treatment chemical and injection fluid provides a continuous flow radially, as seen at 32, from the borehole 28 and through formation 18. This forces the mixture to migrate radially away from borehole 28 and travel through the contaminated part 20 of the formation 18 and toward a production well 12, thereby alternately subjecting the contaminated formation 18 to the mixture of injection fluid slugs 26 and treatment chemical slugs 24.

Figure 3:
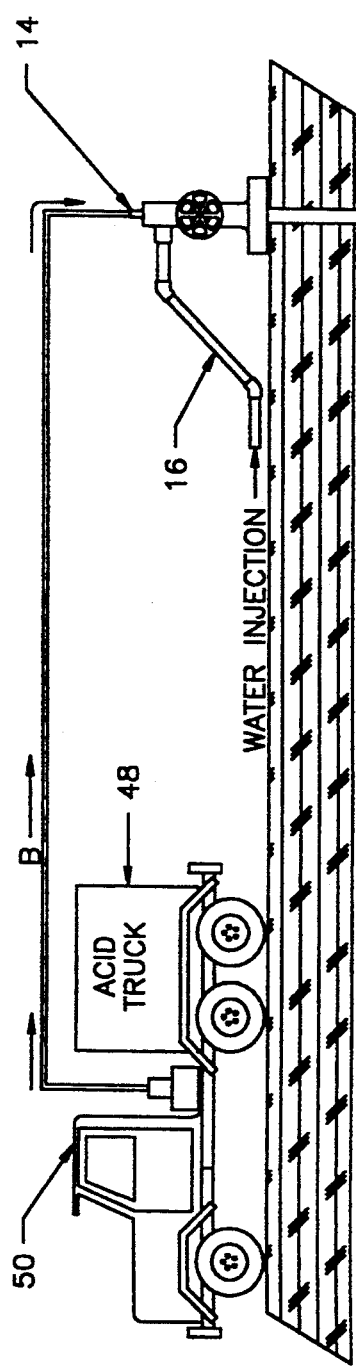
FIG. 3 is a part schematical, part diagrammatical, part cross-sectional view of a wellbore and treating system according to this invention.

The slugs 24 of wash fluid or treatment chemical 32 interact with the contaminates 20 that are the cause of the plugging of formation 18, and thereby washes material from the surface thereof and towards the production well 12, leaving the injection formation 18 ready for the acidizing step of FIG. 3 which completes unplugging of the well.

In FIG. 5, the contaminants 20 could include an irregular piece of plugging material 40, such as a particle 42 of iron sulfide, for example, that has been coated with a film of inhibitor or hydrocarbon film 44. Numeral 46 indicates treatment chemical interacting with the hydrocarbon coating or film 44 to wash the film 44 during the washing step and removes the hydrocarbon film at 46' during the rinsing step 30.

Other time intervals advantageously can be used in carrying out this invention. The surfactant or treatment chemical is a concentrated highly active washing agent such as, for example, "TRITON" non-ionic surfactant X-100 (TM) available from Union Carbide and is admixed with methyl alcohol in a ratio of 50/50. The diluent is water, preferably, the flowing injection fluid.

"TRITON X-100"(TM) is a water-soluble, liquid, non-ionic surfactant. It is an octylphenol ethoxylate with an average of 9 to 10 moles of ethylene oxide and is a 100-percent active product. It has excellent wetting ability, excellent detergency, excellent grease and oil removal from hard surfaces, and good thermal stability. It is soluble at 25 degrees C. in all proportions in water, toluene, xylene, trichloroethylene, ethylene glycol, ethyl ether, ethyl alcohol, isopropyl alcohol, ethylene dichloride, and many other solvents, and is insoluble in kerosene, VM&P naphtha, and mineral spirits, unless a coupling agent is used.

The treatment fluid is therefore a surfactant mixed with a diluent to provide the desired concentration of treatment chemical 22 at a the borehole outlet 29 respective to the borehole 28. The surfactant is conditioned by mixing with alcohol to avoid gelling and/or freezing when the resultant mixture is diluted with water. It is preferred that the concentration of treatment fluid, as it leaves the borehole outlet 29, is effective to wash the contaminants 20 from the surrounding formation 18 for a substantial distance as it flows radially away therefrom. Hence the concentration of the treatment fluid is relatively high as it is discharged from the borehole, and becomes diluted as it is forced from the borehole, and eventually becomes ineffective for washing the contaminants.

Figure 4:
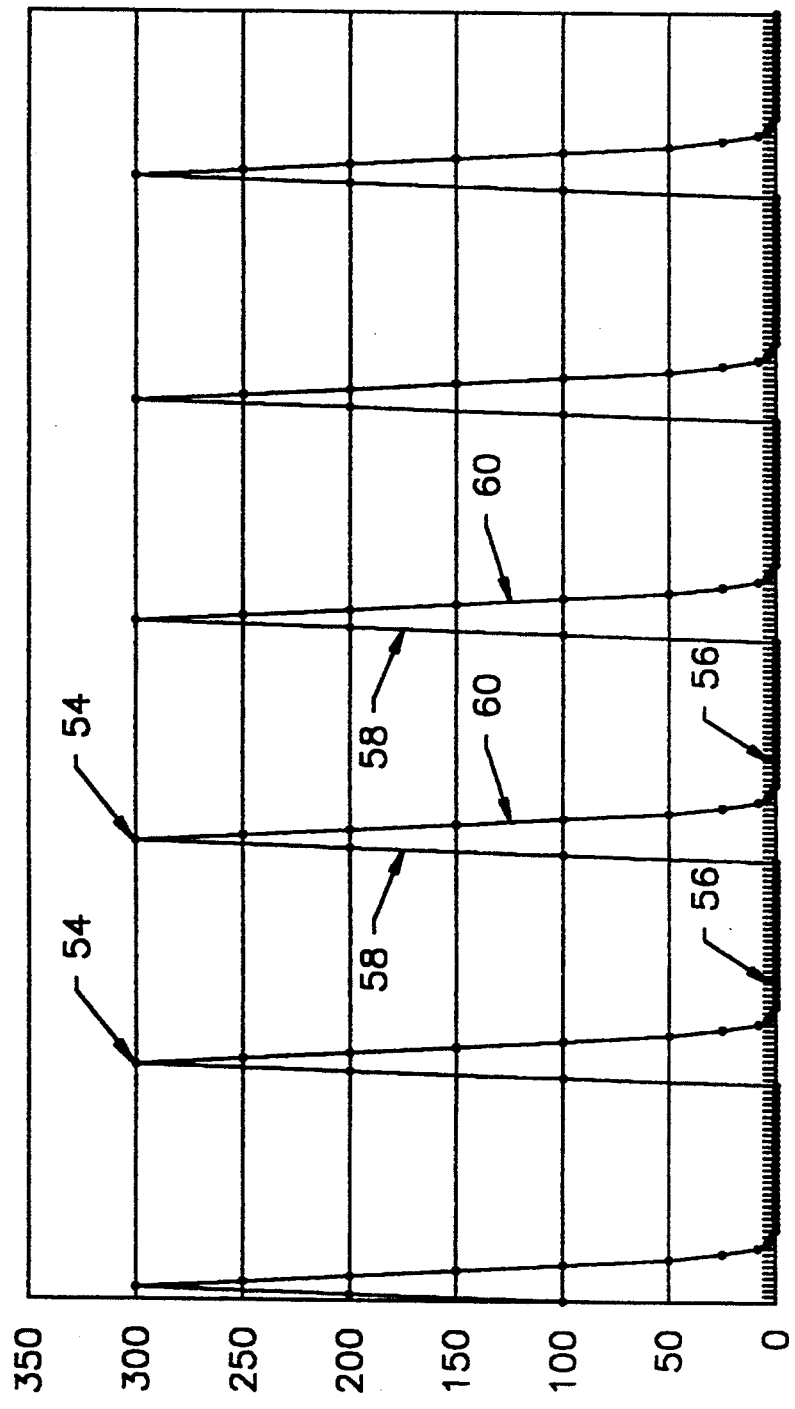
FIG. 4 is a plot of surfactant concentration measured downhole in a borehole; and, FIG. 5 is an enlarged, hypothetical, schematical view of a formation showing a contaminant that forms a piece of plugging material.

In FIG. 4, it can be seen that the surfactant concentration of the treatment chemical is abruptly brought up at 58 from a low or zero level at 56 to a high level at 54 during the washing step, and then again plunges at 60 to a low level at 56 as the rinse cycle of the formation occurs, with this action being repeated each half hour or so. In FIGS. 1, 2 and 5, the surfactant or wash fluid 32, washes the hydrocarbon film 44 from the contaminant particles 42 and then the injection fluid rinses the loosened or changed material 46, which now is free to flow away from the injection well 10 towards the production well 12. Removal of the hydrocarbon film 46, 46' enables water of the injection fluid to wet the formation 18, so that the hydrochloric acid subsequently provided during the acidizing step reacts with the particles 42.

The surfactant or treatment chemical 22, after removing the hydrocarbon film at 46, carries it with the water rinse at 46' radially away from the injection well, leaving the immediate formation water wet which is required for the subsequent acid treatment to react with and remove dissolved iron sulphide, calcium carbonate, calcium sulfate, all of which are otherwise protected by the hydrocarbon film 44 which encapsulates the contaminant particles 42. It is therefore advantageous to first remove the hydrocarbon from the contaminant particles 42, thereby exposing the contaminant particles 42 to be subsequently solubilized or reacted with acid.

In FIG. 3, the flow of treatment fluid and injection fluid is stopped while acid 48 is flowing at 52 from a special acidizing truck 50. Numeral 49 indicates the interface between acid 48 and injection fluid 16 during the spotting of the acid into the formation adjacent borehole outlet 29.

Therefore, as seen in FIG. 5, this invention comprehends treating the particles 42 of contaminants 20 that are plugging the formation 18 to wash the hydrocarbon film 44 away from the contaminants 20 and expose the contaminant particles 42 to the acid 48 which subsequently is flowed from acid truck 50 of FIG. 3 into acid flow line 52 and then into wellhead 14, following the treatment cycles of wash and rinse. This wets the individual particles 42 so that subsequent contact with the hydrochloric acid 48 reacts therewith, with the reactants more or less being solubilized and easily washed radially from the injection well, thereby alleviating the plugging of the formation.

The treatment fluid or chemical 22 used herein is a gel type surfactant, preferably present in an amount above 100 ppm at the injection wellbore, which remains of sufficient concentration as it migrates from the injection well to provide significant cleaning activity up to a 100 foot radius from the wellbore, which is adequate for treating most injection wells.

The unexpected advantage of using a minimum quantity of surfactant by cyclic washing and rinsing the contaminated formation a plurality of times, and, the unexpected advantage of using a minimum of acid to react with and for the removal of the exposed contaminant provides a new process that economically restores an injection well to its original operative condition so that the secondary recovery is more efficiently carried out. Moreover, this novel process eliminates the undesirable use of the present environmentally unsafe chemicals by the substitution of a harmless surfactant therefor.

EXAMPLE

The method of this invention has been used for treating a plugged formation to remove the accumulated undesirable plugging material, as follows:

In an injection well which previously accepted 130 BPD (barrels per day) water at 762 psig (pounds per square inch gauge) many years ago, and has progressively decreased over the years until it now accepts only 20 BPD at 762 psig. It was decided that a 30 minute cycle would be employed for 24 hours each of six days, with 2.5 minutes injection of treatment chemical and 27.5 minutes rinse time. This provides 24×2×6: 288 treatment cycles, wherein the formation is subjected to 288 washing, followed by 288 rinsing actions. This long treatment time was selected because the well is important and the cost of the six day treatment was considered to be of nominal expense (about $2,700 USD), as well as assuring that most of the plugging material would be removed during this time.

The flow rate of the well requires a treatment chemical blended as follows: 40 gallons surfactant admixed with 40 gallons methyl alcohol and 20 gallons water. The mixture is injected for 2.5 minutes for each of the 288 cycles.

The injection wellhead 14 was fitted with an appropriate valve for receiving the treatment chemical. Injection fluid was pumped into the well at 20 BPD at the max allowable wellhead pressure of 762 psig. The unit of FIG. 1 was placed in operation with the before described flow rate of 20 BPD into the wellbore, while admixing treatment chemical 22 with the injection fluid by pumping the treatment chemical blend into the borehole 28 for a second time interval of 2.5 minutes each 27.5 minutes, thereby cyclically treating the well and repeating this cycle each half hour of the day for six days.

At the end of the 288 cycles the injection of treatment chemical was discontinued and the water injection continued for another 4 hours to move the treatment chemical out into the formation and take advantage of its presence.

Next, an acid truck containing 10 BBL of 15% hydrochloric acid was ordered from Permian Basin Acidizing, the well was shut in, and acidizing the well was completed by pumping the acid from the truck tank at a flow rate of 15 BPH into the wellhead, and downhole through the wellbore as seen in FIG. 3. The well was rested for 12 hours, then placed back on stream whereupon the rate of injection at 760 psig increased to 86 BPD.

Hence, upon returning the rejuvenated well to operation, it was deemed to have been successfully treated and to exhibit unexpected improvements heretofore unavailable in the absence of this invention.

The process of this invention is carried out by connecting the injection wellhead to receive treatment chemical which is admixed with the flowing injection fluid, all of which flows down through the borehole thereof and into a downhole formation to wash hydrocarbons from the contaminants causing plugging of the formation. The hydrocarbons are moved towards a production well spaced therefrom. The process for cleaning or removing the plugging material that may have accumulated within the formation is carried out in a plurality of treatment cycles, and each cycle comprises flowing injection fluid into the wellhead for a first time interval while injecting treatment chemical into the flowing injection fluid for a second time interval; with the first time interval being much greater than the second time interval, and with there being at least several treatment cycles each day. Preferably, there is more than one treatment cycle each hour for more than one day, thus providing numerous cycles of treatment prior to the acidizing step.

I claim:

1. An injection well is spaced from a production well and has a wellhead which receives injection fluid for driving hydrocarbons from a formation towards a production well; the injection well formation has become plugged with contaminants that have accumulated therein over an interval of time, thereby causing the wellhead pressure required to effect a selected minimum flow rate of injection fluid into the formation to increase to a maximum value; the method of treating the formation to remove the accumulated contaminants, comprising the steps of:

treating the well for a day by carrying out a plurality of treatment cycles during the day, each treatment cycle is carried out by flowing injection fluid into the wellhead during a first time interval and injecting treatment chemical into the flowing injection fluid during a second time interval; said first time interval is greater than said second time interval;

flowing the injection fluid into the wellhead at a flow rate that produces a pressure which is less than the fracture pressure of the formation and flowing the treatment chemical into the flowing injection fluid at a rate to intermittently establish a mixture of injection fluid and treatment chemical within the formation; whereby the flowing injection fluid forces the mixture to migrate radially away from the injection well and into the formation and toward the production well;

discontinuing the flow of injection fluid and treatment chemical into the injection well and acidizing the injection well to react the contaminants with the acid and thereafter flowing the reaction products away from the injection well by resuming the flow of injection fluid.

2. The method of claim 1 wherein the time intervals of each treatment cycle are ½ hour cycles for a multiplicity of hours, and the treatment chemical is a surfactant that includes an octylphenol othoxylate.

3. The method of claim 1 wherein the treatment chemical is a non-ionic surfactant that is selected to remove hydrocarbons from the outer surface of the contaminants, and the treatment chemical is injected into the injection fluid during one hour time intervals.

4. The method of claim 1 wherein the treatment chemical is a surfactant that is mixed with the injection fluid to provide a wash fluid of a concentration that will wash hydrocarbon from contaminants within a 100 foot radius from the injection well.

5. The method of claim 4 wherein the surfactant is an octylphenol othoxylate and is admixed with an alcohol, and the diluent is the injection fluid.

6. The method of claim 1 wherein the time intervals are ½ hour cycles for a multiplicity of hours, and the treatment chemical flows for at least one minute of each ½ hour cycle, and the injection fluid flows for the remaining cycle time; and, selecting the treatment chemical from a non-ionic surfactant that can remove hydrocarbons from the outer surface of the contaminants.

7. The method of claim 6 wherein the surfactant is an octylphenol othoxylate and is admixed with the injection fluid in a concentration that washes hydrocarbons from the contaminants of the formation in proximity of the injection well.

8. The method of claim 1 wherein the flow rate of the treatment chemical and the flow rate of the injection fluid provides a concentration of more than 12% of treatment chemical in the injection fluid at the borehole outlet;

each cycle has a duration of 30 minute, with there being a second time interval of at least one minute during said 30 minute duration of time for a plurality of cycles.

9. The method of claim 1 wherein the flow rate of the treatment chemical and the flow rate of the injection fluid provides a mixture having a concentration of treatment chemical in the injection fluid that removes the hydrocarbon from the contaminant in the formation at a location adjacent the injection well and, the flow of treatment chemical occurs for at least one minute during a treatment cycle of at least a half hour duration.

10. The process of rejuvenating a downhole formation of an injection well formation that is spaced from a production well, and wherein the injection well has become plugged with contaminants, comprising the steps of:

carrying out a multiplicity of treatment cycles in conjunction with the injection well by flowing injection fluid into the wellhead at a flow rate that requires a pressure that is less than the fracture pressure of the formation while intermittently flowing treatment fluid into the wellhead at a flow rate and quantity to establish a mixture of injection fluid and treatment fluid within the borehole, forcing said mixture to migrate radially away from the borehole of the injection well and travel into the formation and toward a production well by means of the flowing injection fluid;

selecting the flow rate of the treatment fluid respective to the flow rate of the injection fluid to provide a concentration of treatment fluid in said mixture that is adequate for removing hydrocarbons from the surface of the contaminants and thereby enhance the removal of the contaminates in a subsequent acidizing step;

discontinuing the flow of the injection fluid and treatment chemical into the injection well and acidizing the formation of the injection well to react the contaminants thereof with the acid and thereafter flowing the reaction products away from the injection well by resuming the flow of the injection fluid.

11. The process of claim 10 wherein the cycles each have a time interval of one-half hour for a multiplicity of hours, and wherein the treatment fluid flows for at least one minute of each one-half hour cycle and the injection fluid flows for the remainder of the time interval, 12. The process of claim 10 wherein the treatment fluid is a surfactant that is selected to remove hydrocarbons from the outer surface of the contaminants, and the treating fluid is present in a concentration of at least 12% in the mixture.

13. The process of claim 10 wherein the treatment fluid is a non-ionic surfactant that is first mixed with an alcohol and thereafter is added to the flowing injection fluid to provide a wash having a concentration that is effective to wash hydrocarbon from contaminants for a distance of about a 100 foot radius from the injection well.

14. The process of claim 13 wherein the surfactant is an octylphenol othoxylate.

15. The process of claim 10 wherein the time intervals are one hour cycles for a multiplicity of hours, wherein the treatment fluid flows for at least one minute of each one hour cycle and the injection fluid continues to flow during the entire cycle time; and, the treatment fluid is a surfactant that is selected to be effective to remove hydrocarbons from the outer surface of the contaminants.

16. The process of claim 15 wherein the surfactant is an octylphenol othoxylate and is admixed with alcohol, and the diluent is the injection fluid of a concentration to provide a mixture that washes hydrocarbon from the contaminants at a substantial distance from the injection well.

17. The process of claim 15 wherein the flow rate of the treatment fluid and the flow rate of the injection fluid is selected to provide a concentration of more than 12% of surfactant in the mixture;

the intermittent flow of treatment fluid occurs during a time interval of at least one minute during each treatment cycle.

18. The process of claim 10 wherein the treatment fluid is a surfactant and the flow rate of the treatment fluid and the flow rate of the injection fluid is selected to provide the mixture with a concentration that removes the hydrocarbon from the contaminants at a location spaced up to 100 feet from the injection well; and, the intermittent flow of treatment fluid occurs during each long interval of time for said multiplicity of treatment cycles.

19. In an injection well having a wellhead connected to receive injection fluid that flows through a borehole thereof and down to a downhole formation to drive hydrocarbons from the formation towards a production well spaced therefrom; a process for cleaning contaminants that may have accumulated within the formation; comprising the steps of:

carrying out a plurality of treatment cycles by flowing injection fluid into the wellhead during a first time interval while injecting treatment chemical into the wellhead during a second time interval that is part of the first time interval;

said first time interval is greater than said second time interval, with there being a plurality of treatment cycles each day for at least one day;

flowing the injection fluid into the wellhead at a flow rate that produces a pressure which is less than the fracture pressure of the formation while intermittently flowing the treatment chemical into the wellhead at a rate to establish a mixture of injection fluid and treatment chemical within the borehole; forcing the mixture to migrate radially away from the borehole and wash hydrocarbons from the contaminants as the mixture travels through the formation and toward a production well;

discontinuing the flow of the injection fluid and treatment chemical into the injection well and acidizing the formation of the injection well to react the washed contaminants thereof with the acid and thereafter flowing the reaction products of the acid and contaminants away from the injection well by resuming the flow of the injection fluid.

20. The process of claim 19 wherein the flow rate of the treatment chemical and the flow rate of the injection fluid provides a concentration of treatment chemical in the mixture that is effective to remove the hydrocarbon from the contaminant at a radially spaced location from the borehole; and, the intermittent flow of treatment chemical occurs for a time interval of at least one minute during each interval of time required for each of the plurality of treatment cycles.

21. The process of claim 19, wherein the treatment chemical includes a surfactant which is admixed with the injection fluid, and provides a mixture that washes hydrocarbon from contaminants within a 100 foot radius of the injection well;

the flow rate of the treatment fluid and the flow rate of the injection fluid provides a concentration of more than 12% of treatment fluid in the mixture;

the intermittent flow of treatment fluid occurs during each of the plurality of treatment cycles; whereby, the flow rate of the treatment fluid and the flow rate of the injection fluid provides a concentration of treatment fluid in the injection fluid that removes the hydrocarbon from the contaminant at a location spaced from the borehole.

* * * * *